US005536402A

United States Patent [19]
Kluhsman

[11] Patent Number: 5,536,402
[45] Date of Patent: Jul. 16, 1996

[54] MULTIPLE PURPOSE FILTER

[75] Inventor: Melvin L. Kluhsman, Lockwood, Mo.

[73] Assignee: Kluhsman Machine, Inc., Lockwood, Mo.

[21] Appl. No.: 287,502

[22] Filed: Aug. 8, 1994

[51] Int. Cl.6 .................................................. B01D 35/01
[52] U.S. Cl. ........................ 210/232; 210/316; 210/448; 210/496; 210/497.3
[58] Field of Search .................................... 210/316, 445, 210/446, 448, 449, 450, 454, 497.3, 496, 232, 497.01; 55/523

[56] References Cited

U.S. PATENT DOCUMENTS

| | | |
|---|---|---|
| 1,061,368 | 5/1913 | Gilliam . |
| 2,367,055 | 1/1945 | Rike et al. . |
| 2,598,818 | 6/1952 | Muirhead ................................ 210/445 |
| 2,604,958 | 7/1952 | Leufvenius . |
| 2,748,802 | 6/1956 | Hanson et al. . |
| 2,982,418 | 5/1961 | Balley . |
| 3,731,815 | 5/1973 | Collingwood et al. . |
| 4,169,795 | 10/1979 | Raines . |
| 4,295,969 | 10/1981 | Hagberg ................................... 210/446 |
| 4,342,375 | 8/1982 | Lyden . |
| 4,356,091 | 10/1982 | Niles . |
| 4,515,133 | 5/1985 | Roman . |
| 4,617,121 | 10/1986 | Yokoyama . |

OTHER PUBLICATIONS

Reinsch, Filters Made of Porous Metal Can Be Fabricated in Special Shapes, Product Engineering, Nov. 1944, pp. 769–771.

*Primary Examiner*—Matthew O. Savage
*Attorney, Agent, or Firm*—Hovey, Williams, Timmons & Collins

[57] ABSTRACT

Improved high capacity fluid filter assemblies (10, 58) especially adapted for racing vehicles are provided. The assemblies (10, 58) include an elongated, rigid tubular outer casing (12) with endmost fittings (22, 60, 24) permitting flow of fluid through the casing (12). An elongated filtering element (14) formed of sintered bronze is located within the casing (12) and has a length at least three times the maximum outer dimension of the filtering element (14). In order to promote flow of fluid through the filtering element, a continuous fluid zone (52) is provided within the casing (12) outboard of the filtering element (14). A secondary sintered bronze filtering member (54) may be secured within the outlet end fitting (24).

7 Claims, 1 Drawing Sheet

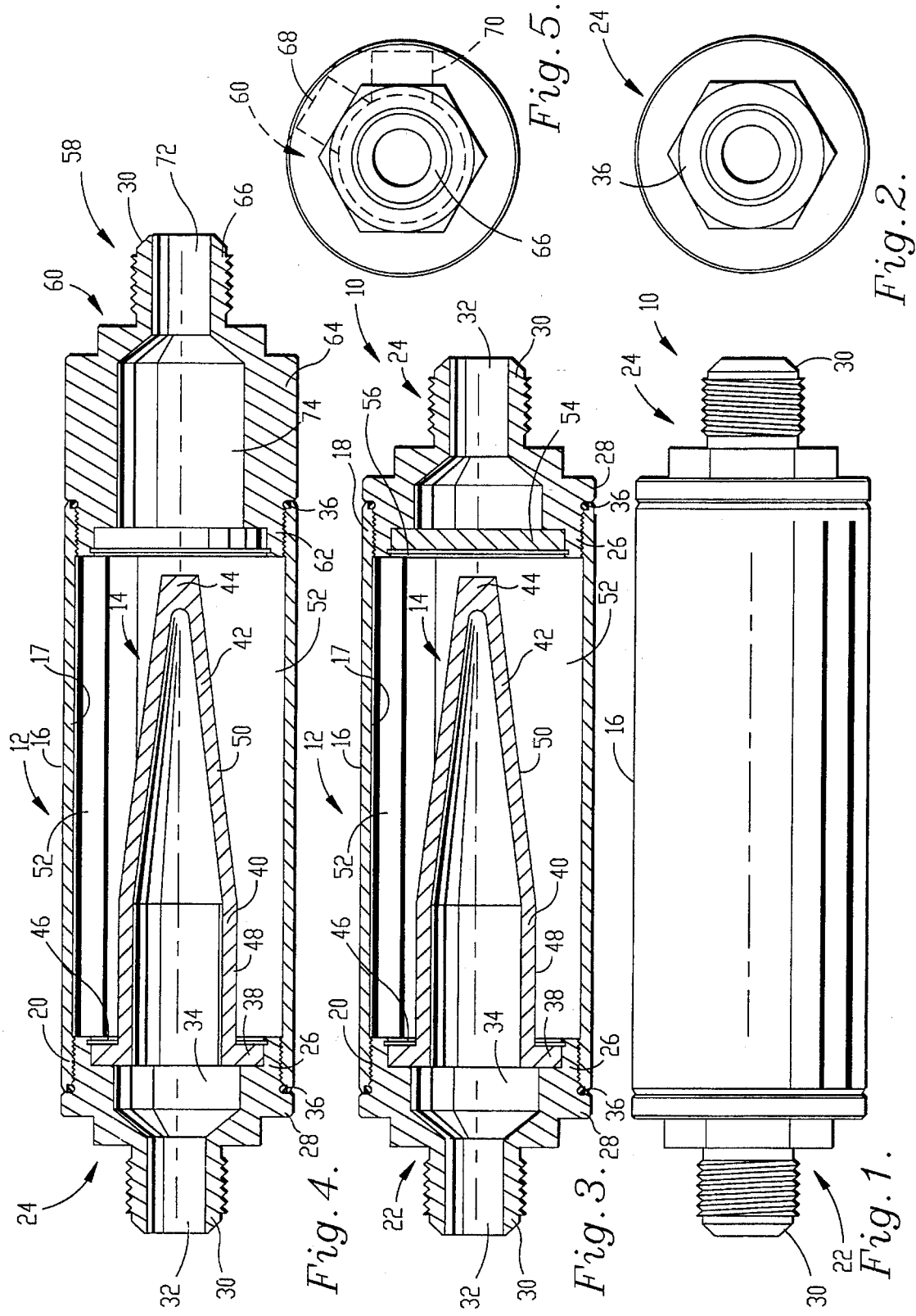

MULTIPLE PURPOSE FILTER

BACKGROUND OF THE INVENTION

1. Field of the Invention

The present invention is broadly concerned with an improved, high capacity filtering assembly useful for the filtering of fluids containing contaminants. More particularly, the invention pertains to a filtering assembly particularly adapted for filtering of liquids such as automotive fuel and which includes a rigid outer casing having an internal, sintered bronze filtering element.

2. Description of the Prior Art

Virtually all automobiles are provided with fuel filters for preventing contaminants contained within fuel from entering the delicate carburetion equipment associated with automobile engines. In the case of ordinary passenger vehicles, such present-day filters are entirely adequate and have long service lives. However, racing vehicles using specialized fuels (alcohol-based fuels) and having fuel demands far in excess of ordinary automobiles present filtering demands which are not adequately met by existing filters. Generally, filters in use today in racing vehicles are formed of paper or screen material, and are in general relatively expensive. In the case of paper filters, a serious problem arises by virtue of the tendency for water to collect therein, particularly when filtering of high performance alcohol-based fuels. As a consequence, the paper filters tend to rapidly erode and degrade, thereby losing their filtering effect.

U.S. Pat. No. 2,982,418 describes a small fuel filter in the form of a porous "thimble" adapted for placement within a flexible fuel line. However, this type of filtering element frictionally situated within a flexible line presents only a conical filtering surface which is believed to be entirely too small for adequate use in racing engines. Other representative filters of the prior type include those described in U.S. Pat. Nos. 1,061,368, 2,748,802, 3,731,815, 2,604,958, 2,367,055, 4,617,121, 4,342,375, 4,169,795, 4,356,091 and 4,515,133.

SUMMARY OF THE INVENTION

The present invention overcomes the problems outlined above and provides an improved filter assembly which can be used for high capacity filtering of fuels, transmission oils, or other types of fluids requiring filtering. Broadly speaking, the filter assembly of the invention includes an elongated, rigid tubular outer casing having end fittings for permitting flow of fluid to be filtered into, through and out of the casing. An elongated filtering element formed of sintered bronze is disposed within the casing for filtering of fluid passing therethrough; the element includes a base, an elongated sidewall portion and an portion defining the extreme end of the filtering element remote from the base. The length of the filtering element from the base to the extreme end thereof is at least three times the maximum outer dimension of the sidewall portion of the filtering element. Further, the outer surfaces of the element sidewall and end portion are spaced inwardly from the casing inner surface to present a continuous fluid zone within the casing and outboard of the sidewall and end portion outer surfaces. This permits and promotes flow of fluid through both the sidewall portion and end portion of the filtering element, substantially throughout the length thereof, to achieve the maximum filtering effect.

In preferred forms, the filtering element end portion is in the form of elongated, frustoconical section with a flattened outermost end; the length of the frustoconical section is advantageously greater than the length of the sidewall portion of the filtering element. The filtering element is normally of concavo-convex configuration, and has a wall thickness of from about 1/16–1/4 inches. A variety of porosities can be used, but normally the sintered bronze material forming the filtering element should have an average pore size of from about 20–200 microns.

The base of the filtering element is preferably in the form of an outwardly extending flange, which can be secured to an end fitting of the assembly by means of a snap ring or similar expedient.

If desired, a secondary filtering member in the form of a sintered bronze disc can be used, and is typically secured within one of the end fittings of the assembly for secondary filtering of the fluid after passage thereof through the primary filtering element.

BRIEF DESCRIPTION OF THE DRAWINGS

FIG. 1 is an elevational view of a filtering assembly in accordance with the invention;

FIG. 2 is an end view of the assembly depicted in FIG. 1;

FIG. 3 is a vertical sectional view of the assembly shown in FIGS. 1–2;

FIG. 4 is vertical sectional view of another type of filtering assembly in accordance with the invention, which is particularly designed for fuel injection systems; and FIG. 5 is an end view of the assembly depicted in FIG. 4, illustrating construction of the input end fitting.

DETAILED DESCRIPTION OF THE PREFERRED EMBODIMENTS

Turning now to the drawings, and particularly FIGS. 1–3, a filtering assembly 10 is illustrated. Broadly speaking, the assembly 10 includes an outermost tubular metallic (aluminum) casing 12 as well as an internal concavo-convex filtering element 14 formed of sintered bronze.

In more detail, the casing 10 includes an elongated tubular body 16 having an inner surface 17 and internal endmost threading 18 and 20 adjacent the ends of the body. The casing 10 is equipped with inlet and outlet fittings 22, 24 which are threadably secured within the ends of body 16. Inlet end fitting 22 is formed of anodized aluminum material and presents an externally threaded, tubular segment 26, a radially expanded section 28 and an outermost, externally threaded nipple 30. As illustrated in FIG. 3, nipple 30 presents a cylindrical passageway 32, the latter communicating with a radially expanded internal passageway 34. A sealing ring 36 is disposed about the inner surface of section 28 and is received within an appropriate concavity formed within the adjacent end of casing body 16 as shown. The outlet fitting 24 is identical with fitting 22 and therefore like reference numerals have been applied to this fitting as well. As can be appreciated, the casing body 16 with the end fittings 22, 24 permits flow of a fluid to be filtered into, through and out of the casing 10.

Filter element 14 in the embodiment illustrated is an integral, monolithic structure and includes a radially outwardly extending base 38, a substantially constant diameter cylindrical sidewall portion 40 and an end portion 42 defining the extreme end 44 of the element remote from base 38. Again referring to FIG. 3, it will be observed that the end portion 42 is of frustoconical configuration and has a length greater than the length of the sidewall portion 40. The extreme end 44 is flattened as shown. The element 12 is affixed to inlet end fitting 22 with the concave face thereof in communication with passageway 34. In particular, the base 38 of filtering element 14 is disposed within the internal recess or bore defined by segment 26. As shown in FIG. 3, the tubular segment 26 includes a bore formed therein defining peripheral shoulder axially facing an interior of the casing. The bore includes a circumferential groove axially spaced from the shoulder in a direction toward the interior of the casing. A conventional snap ring 46 is disposed in the groove wherein flange is axially retained within the bore between the shoulder and the snap ring to secure the base, and thus the entire filtering element 14, to inlet end fitting 22.

The length of the filtering element 14 from base 38 to extreme end 44 is at least about three times the maximum outer dimension of sidewall portion 40. In the embodiment illustrated, this maximum dimension is the outer diameter of the portion 40.

As also clearly apparent in FIG. 3, the outer surfaces 48, 50 of the sidewall portion 40 and end portion 42 are spaced inwardly from the inner surface 17 of casing body 16, so as to present a continuous annular fluid zone 52 about both portions 40 and 42 and within the confines of body 16. Advantageously, the minimum total cross-sectional area (i.e., perpendicular to the longitudinal axis of the element 14) of the zone 52 outboard of the exterior surfaces 48, 50 of the element 14 is greater than the maximum cross-sectional area of the element 14, again taken perpendicular to the longitudinal axis thereof.

The outlet end fitting 24 in the embodiment of FIGS. 1–3 includes a secondary sintered bronze filtering disc 54. Generally, the disc 54 would be of smaller porosity than that of the filtering element 14, and is held in place within fitting 24 by means of snap ring 56.

In the use of filter assembly 10, appropriate fluid inlet and outlet lines (not shown) are threadably affixed to inlet and outlet fittings 22, 24. A fluid to be filtered, e.g., gasoline or other automotive fuel, such as methanol and other alcohol-based racing fuels, passes through passageways 32, and 34 into the concavity presented by filtering element 14. The fuel then passes through the sidewall and end portions 40, 42 of the element 14 and into zone 52. Thereafter, the fuel passes through secondary filtering member 54 and thence through the passageways of outlet fitting 24 and into the outlet line. Owing to the construction of filter assembly 10, a large volume of fuel can be filtered. For example, in the design shown, fuel delivered at a pressure of about 12 psi can be filtered at a rate of about 5 gallons per minute. This is far in excess of the demands of even the largest racing engines.

Attention is next directed to FIGS. 4–5 which illustrates another type of filtering assembly 58. The latter is in most respects identical with assembly 10, except in the orientation of filtering element 14 and the construction of inlet end fitting 60. Thus, where like parts appear, as compared with the FIGS. 1–3 embodiment, like reference numerals are employed.

Inlet end fitting 60 is formed of anodized aluminum material and includes an externally threaded, tubular section 62, a radially enlarged, elongated barrel segment 64 and an endmost, externally threaded nipple 66. In addition, the barrel segment 64 is equipped with a pair of threaded return ports 68, 70. Internally, the fitting 60 includes a cylindrical passageway 72 as well as an enlarged inner passageway 74. The ports 68, 70 communicate with the passageway 74, and the latter communicates with zone 52 within casing body 16.

In the use of assembly 58, a fuel inlet line is threadably affixed to nipple 66 and a fuel outlet line is similarly affixed to nipple 30 of outlet end fitting 24. In addition, fuel return line(s) from the carburetion system of the engine are connected to one or both of the ports 68, 70. Fuel from the vehicle tank is directed through passageway 72, 74 and into zone 52; likewise, return fuel through the ports 68 and/or 70 enters through passageway 74 into zone 52. This fuel is filtered by passage through element 14, whereupon the fuel travels through the passageways of fitting 24 to the carburetion system of the vehicle. It will of course be appreciated that in the embodiment shown, the fuel passes first from the outlet board zone 52 inwardly, whereas in assembly 10, the fuel to be filtered first passes through the element 14 in the opposite direction.

Although the filter assemblies of the invention have been principally described with reference to filtering of automotive fuels, the invention is not so limited. That is to say, with appropriately sized filtering element(s), transmission oil or other fluids can be successfully treated. Thus, in the case of gasolines or other high performance fuels, sintered bronze filtering elements having relatively small average pore sizes from about 30–50 microns would typically be used. However, for transmission oils, filtering elements with larger average pore sizes from about 100–150 microns would be more appropriate.

I claim:

1. A filter assembly comprising:

an elongated, rigid tubular outer casing presenting a pair of opposed axial ends, and an inner cylindrical surface, the casing including a first filter element supporting fitting removably attached at one end of the casing and a second fitting attached to the other end of the casing for permitting flow of a fluid to be directed through the casing, wherein said first fitting includes a tubular segment disposed within the respective axial end of the casing;

an elongated filtering element formed of sintered bronze, the filtering element including an annular base defining an outwardly extending flange, an elongated hollow sidewall portion connected to the base and presenting inner and outer sidewall surfaces, and an elongated frusto-conical end portion defining an end of the filtering element remote from the base, the length of the filtering element being at least about three times greater than the maximum diameter of the outer surface of the sidewall portion, the outer surface of the sidewall portion being spaced from the inner surface of the casing to present a continuous fluid-flow zone within the casing and outboard of both said portions of the filtering element, the minimum total cross-sectional area of the fluid-flow zone being greater than the maximum cross-sectional area of the filtering element sidewall portion for permitting flow of the fluid through the filtering element along the length of both said portions; and a means for retaining the filtering element within the casing in a location for filtering of the fluid as the fluid passes through the casing, wherein said means for retaining includes a bore formed in the tubular segment of one of said fittings for receiving said flange, said bore defining peripheral shoulder axially facing an interior of said casing, said bore further including a circumferential groove axially spaced from said shoulder in a direction toward the interior of the casing, and a snap ring disposed in said groove, wherein said flange is axially retained within said bore between said shoulder and said snap ring.

2. The filter assembly of claim 1, said sintered bronze having an average pore size of from about 20–200 microns.

3. The filter assembly of claim 1, each of said fittings being threadably coupled to a respective end of said casing.

4. The filter assembly of claim 1, said casing being formed of metal.

5. The filter assembly of claim 1 comprising a secondary filtering member and a means for retaining the secondary filtering member within the casing in a location spaced from the filtering element for filtering the fluid after passage thereof through said filtering element.

6. The filter assembly of claim 5, said secondary filtering member being formed of sintered bronze.

7. The filter assembly of claim 1, said filtering element having a wall thickness of from about 1/16–1/4 inches.

* * * * *